Nov. 12, 1963   J. E. RUZICKA   3,110,369
SELF-DAMPED LAMINAR STRUCTURE
Filed May 22, 1959   3 Sheets-Sheet 1

INVENTOR.
JEROME E. RUZICKA
BY
Dike, Thompson & Bronstein
ATTORNEYS

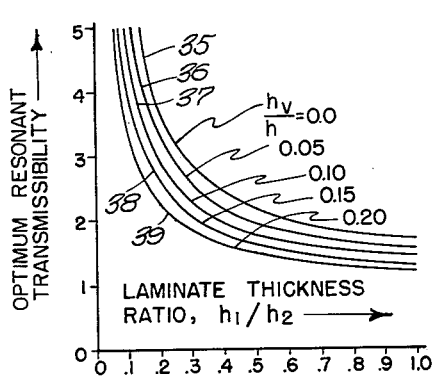
FIG. 8
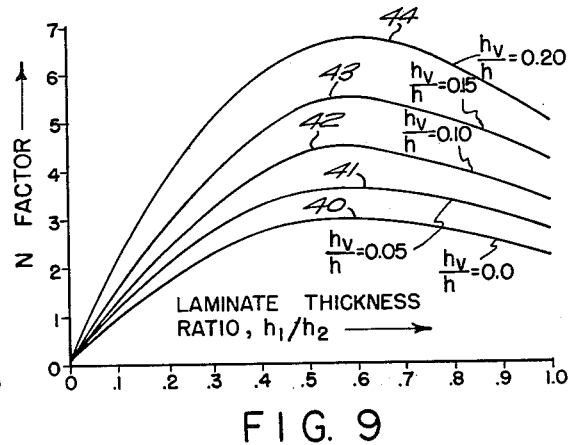
FIG. 9
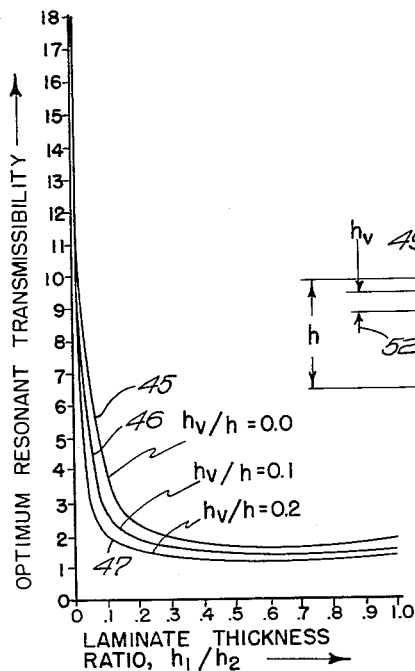
FIG. 10
FIG. 11

3,110,369
SELF-DAMPED LAMINAR STRUCTURE
Jerome E. Ruzicka, Belmont, Mass., assignor to Barry Wright Corporation, Watertown, Mass., a corporation of Massachusetts
Filed May 22, 1959, Ser. No. 815,051
6 Claims. (Cl. 189—34)

The present invention is concerned with improvement of vibration characteristics of structural sheet members, and, in one particular aspect, with novel and improved prefabricated composite structures having sheet-like proportions and which are uniquely manufactured to have both high structural strength and optimum inherent self-damping against responses to excitation of vibratory character.

Static loading requirements of structures, even though severe, can generally be satisfied through routine engineering design procedures which recognize that homogeneous elements of given materials and geometries can safely withstand predetermined fixed or slowly-varying loadings such as those of tension, compression, bending and shear. Such characteristics are well known in the case of solid structural sheets of various materials and thicknesses, for example. In many instances, however, the mere capability of such sheet material to withstand simple static loads is not enough and there must also be immunity from the destructive effects of fatigue and high peaked loadings which may be encountered under transient shock or sustained vibration conditions. The latter conditions can bring large variable forces into such highly complex interplay that it becomes virtually impossible to predict and forestall all consequences to be expected with all dynamic environments, and the structural designer is severely handicapped. Consequently, "brute-force" attempts have commonly been made to prevent failures of such origins through crude over-designing, that is, through incorporating sheet materials of strength and bulk sufficiently in excess of the dictates of the static loading requirements to provide a large safety factor. It is known, however, that the principal destructive effects of vibration in structures develop either out of transmission of vibratory forces through structural elements or out of resonance within such elements, or both. Accordingly, these factors have suggested more sophisticated design approaches which involves the isolation of troublesome panels by elastic or absorbent pads, which tend to prevent vibratory forces from ever reaching such parts; or which involve the direct attachment of dampers to these parts to dissipate the vibrational energy within them and suppress responses at or near critical frequencies; or which involve direct attachment of weighty material to these parts to detune their resonant responses away from critical frequencies. It will be recognized that the over-design approach can introduce high material costs and undesirable bulk and weight; the isolation approach can introduce structural infirmities or flexibility at the positions where isolating pads or layers appear between juxtaposed parts of an assembly, and can permit resonance conditions to develop within the isolated parts themselves; the usual damping approach may require accessory dampers which are costly to install and interfere with mechanical nicety of design; and the detuning approach can introduce unwanted weight, bulk, cost and laborious assembly practices.

These difficulties are particularly pronounced in the case of structural sheet, which is commonly employed for panelling, chassis construction, and the like, because such thin large-area constructional elements naturally tend to be highly vibratile. Sheet elements are in fact so responsive as to be susceptible to movement induced by noise transmitted through the ambient atmosphere, as well as to mechanically-transmitted forces and movements. Wherever applications permit, the prudent designer also seeks to have needed sheet constructional elements perform load-carrying functions in addition to the usual simple enclosing or covering functions, as in the examples of chassis and panels for electrical equipment which may be required to carry the substantial loads imposed by associated electrical components and hardware. In many applications, of course, the exposed outer surfaces must also be capable of withstanding severe environmental forces such as those of abrasion and impact, and sturdy sheet stock must be selected. It is important, therefore, not only that the dynamic responses be suppressed but the utmost in static strength be available, and these without waste and undue weight of material. Further, it often proves unpractical and uneconomical to isolate discrete sections of thin sheet material, or to attach small dampers laboriously at a number of positions for the purpose of suppressing vibrations at each of these positions.

In accordance with teachings of the present invention, structural stock having external characteristics of sheet materials, either in simple planar or more complex shaped configurations, is itself caused to develop inherent highly-damped characteristics which can entirely obviate the need for auxiliary damping or isolating elements. This is accomplished through initial fabrication of the sheet stock in common preferred commercial sizes but in unique laminated form which occasions especially high static strengths and which incorporates damping medium of critical proportions and viscosity wholly within and distributed uniformly throughout interior surfaces of the stock, the damping medium also performing an important bonding function. As is detailed later herein, structures embodying such stock become substantially immune to occurrence of resonance conditions of dangerous magnitudes and are materially less susceptible to fatigue failures. The improved stock lends itself to economical manufacture of structural elements in a wide variety of configurations through use of only common production techniques, while occasioning inherent suppression of inordinately large vibration magnification or transmissibility.

It is one of the objects of the present invention, therefore, to provide novel and improved composite prefabricated sheet-like structural members which possess high static strength and which are critically self-damped to prevent development or transmission of large magnitudes of vibration.

A further object is to provide improved thin prefabricated structural sheet having optimum self-damped vibration characteristics which facilitate low-cost manufacture of fatigue-resisting damped structures including chassis, panels or other elements fabricated of sheet stock.

Another object is to provide as improved articles of manufacture self-damped sheet stock fabricated of at least two sheet metal laminas having thicknesses in predetermined ratio and preserved together at all points by a permanently viscous medium of predetermined thickness and optimum viscosity, whereby both the load-resisting and vibration suppression characteristics are rendered optimum and the amount and weight of material required to sustain static and dynamic loadings are reduced.

It is a yet further object to provide improved prefabricated structural sheet members having smooth surfaces and high strengths and which are inherently self-damped against vibration at excessive amplitudes, and which readily lend themselves to the low-cost fabrication of structures using conventional production techniques.

By way of a summary account of practice of this invention in one of its aspects, there is provided an enclosure and chassis assembly in which the substantially planar metal stock thereof is cut, pierced and bent into a common three-dimensional configuration to accommodate, interconnect, and mount certain mechanical and electrical circuit components. The planar stock of which the assembly is made is fabricated in thicknesses up to about one-eighth of an inch using a pair of coextensive planar metal laminate members. One of these members is at least one and one-half times the thickness of the other and makes the principal contribution to load-supporting characteristics of the stock, and the other laminate member promotes both an auxiliary load-supporting function and an important damping function. The thinner member is preferably of material having a higher modulus of elasticity than that of the thicker lamina, although the moduli may conveniently be the same in some instances, and, in either event, the thinner member is itself of at least a minimum thickness imparting at least a certain minimum rigidity in transverse bending directions and a minimum physical strength which prevents rupture, tearing, stretching and like surface damage and deformations. Intermediate these laminas, and completely covered by them except at the thin outer edges of the stock, there is disposed a continuous film layer of permanently viscous or viscoelastic damping medium of but a few thousandths of an inch thickness, which thickness dimension is small in relation to those of the metal laminas. This film of damping medium is characterized both by high molecular cohesiveness and by high molecular adhesiveness to the laminates, and the effect thereof is to preserve the laminas together in substantially the relationship they are initially pressed together with the viscoelastic medium between them. Both the coefficient of viscosity and the film thickness of the medium are significant, suitable values being related to the thickness ratio and moduli of elasticity of the laminas. Vibratory excitation either of the structure as a whole or only of parts thereof results in optimized vibration-suppression effects at all positions where needed, and the load-supporting and force-resisting strengths are of optimum high values for the sheet materials and stock dimensions involved.

Although the features of this invention which are believed to be novel are set forth in the appended claims, further details of the invention in its preferred embodiments, and the further objects and advantages thereof, may be readily comprehended through reference to the following description taken in connection with the accompanying drawings, wherein:

Figure 4:
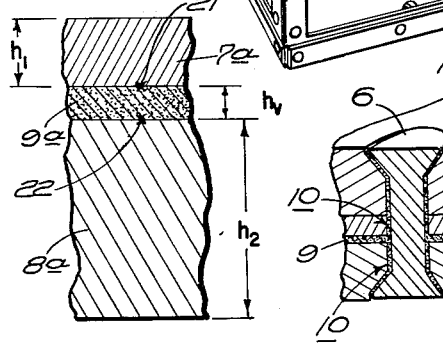
Figure 2:
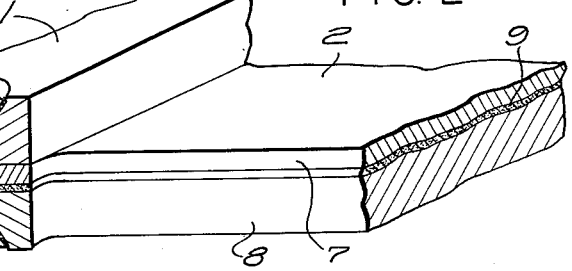
FIGURE 2 is an enlarged pictorial representation of a fragment of a joined panel and bracket in the self-damped structure of FIGURE 1.
Figure 12:
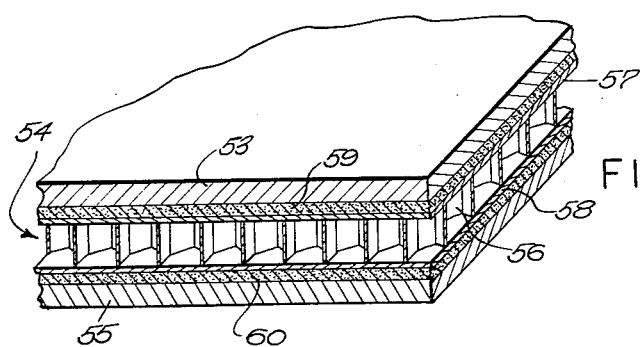
Figure 3:
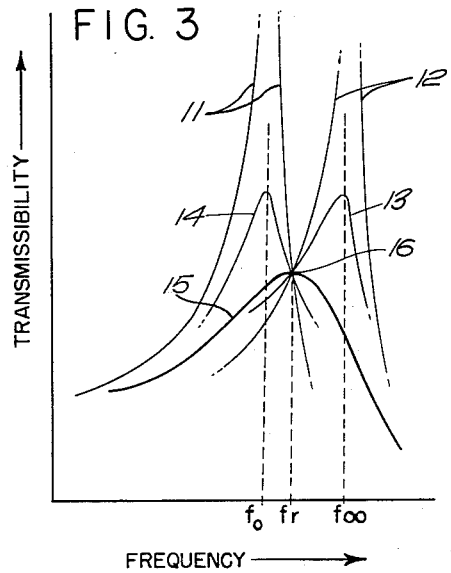
Figure 5:
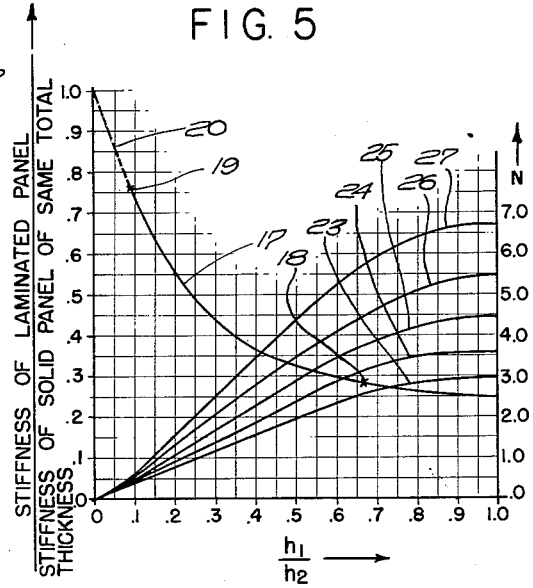
Figure 7:
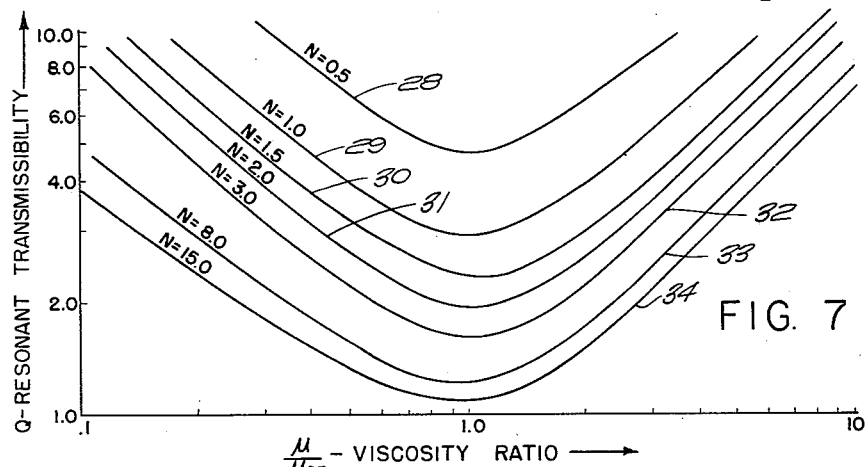
Figure 6:
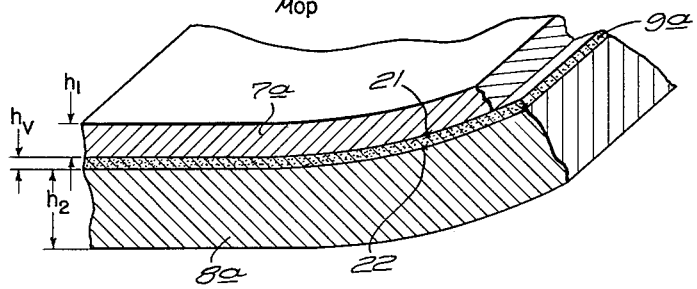

FIGURE 3 graphically portrays typical resonant magnification and vibration transmissibility characteristics, in the region of fundamental mode vibration, of laminar sheet members incorporating different damping media;

FIGURE 4 is an enlarged cross-section of self-damped panelling such as that of FIGURE 2;

FIGURE 5 plots static stiffness characteristics and variations in a special damping design factor against ratios of lamina thicknesses in self-damped composite laminar panelling;

FIGURE 6 is an enlarged cross-section of self-damped sheet stock depicted in a condition of pronounced flexure which develops viscous shear;

FIGURE 7 plots fundamental mode resonant transmissibility vs. a viscosity ratio for self-damped sheet stock, in a family of curves each representing sheet stock having a distinctive design factor;

FIGURE 8 provides a family of curves in which optimum resonant transmissibility is plotted against ratios of lamina thicknesses for self-damped composite laminar panels each having a different thickness of viscous damping material;

FIGURE 9 plots a special damping design factor vs. ratios of lamina thicknesses for laminar composite stock in which two laminas are of different moduli of elasticity;

FIGURE 10 provides a family of curves in which optimum resonant transmissibility is plotted against ratios of thicknesses of laminas having different moduli of elasticity;

FIGURE 11 illustrates part of self-damped laminar panel cross-sectioned to show provisions for maintaining a fixed thickness of viscous damping medium; and FIGURE 12 is a cross-sectioned pictorial view of a further self-damped panel construction including a honeycombed load-carrying element which cooperates with a pair of planar laminas to develop damping effects.

Figure 1:
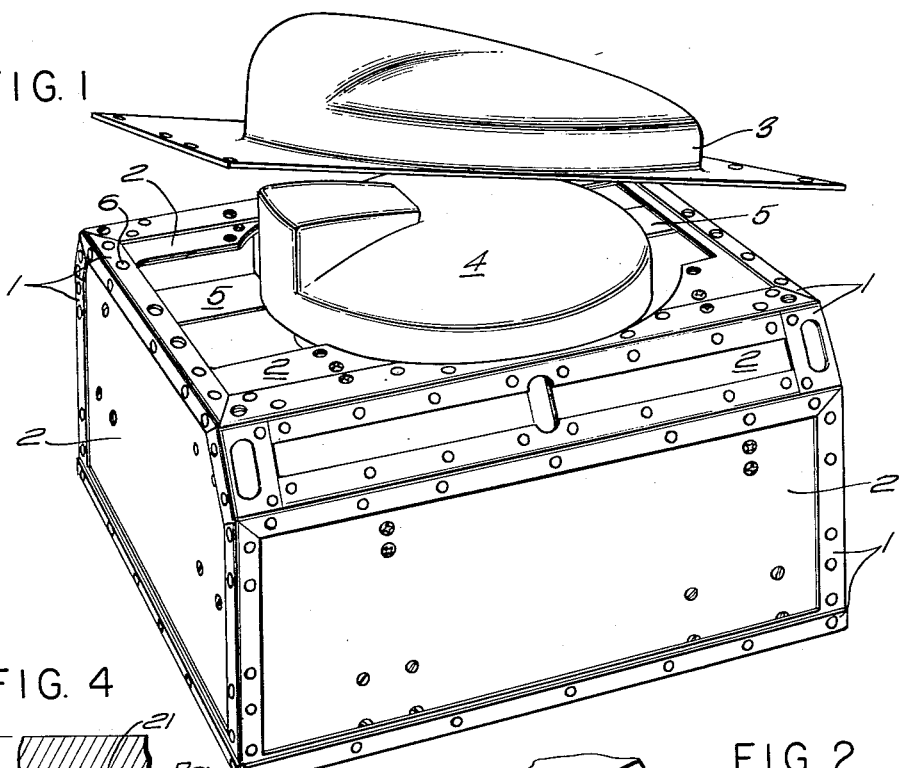
FIGURE 1 depicts a load-bearing chassis and panel assembly fabricated in part of self-damped stock and involving practice of teachings of this invention.

The arrangement depicted in FIGURE 1 includes joined framework elements 1 upon which a number of substantially planar panels 2 are mounted to form, with the shaped cover 3, an enclosure and chassis assembly for an electromechanical device 4. For illustrative purposes, the latter device is one having the casing configuration of a form of gyroscope unit, and it is suspended within the enclosure upon suitable bracket members 5 and other associated hardware, not shown. In this apparatus, the gyroscope device typifies delicate high-precision equipment which must be well protected against effects of severe environmental vibrations and shock, and which is of substantial mass and thus tends to impress high loadings upon its external supports. The enclosure and chassis assembly is intended to be mounted directly upon the frame of the supporting craft, without intermediate isolation and damping provisions, and to experience the full accelerations and vibrations appearing at this site.

Panels 2, which are all merely about 1/16 inch in thickness, and some of which have width and length dimensions of the order of 10 or 12 inches, are intended to support the gyroscope, channel the flow of cooling air, protect the internal parts from contaminants, strengthen the framework, and shield the internal components against noise-induced vibration and shock. Were these panels each in the conventional form of solid sheet having thickness needed to support loads imposed by the gyroscope, both the transmissibility and resonant magnification characteristics would tend to become intolerably large. That is, externally-applied vibratory and shock forces would be readily transmitted through the solid sheet material to the mounted components, and the latter would then be highly susceptible to damage from these sources. Such forces as are transmitted in this way, and also such forces as are induced in the panels by high-amplitude noise from the ambient atmosphere, will further tend to develop high peaks of resonant vibration both in the assembly as a whole and in various discrete portions of it. Under these undesirable mechanical resonance conditions, the vibration amplitudes can become so intense as to cause permanent injury to the delicate components and occasion rapid fatigue failures in the material itself. A common expedient which has been employed to minimize the transmissibility problems is the so-called "shock mount," a number of which could be interposed as accessories between the enclosure and the craft frame on which it is supported, for example. Combinations of springs, elastomeric materials, absorbent padding, and dashpot-like provisions in such shock mounts tend to dissipate vibrational energy and afford a measure of isolation. However, these accessories add to the overall bulk and mechanical complexity, and introduce costly manufacturing and installation operations.

Shock mounts are of course ineffective to prevent vibration and resonances which are caused by forces reaching the supported assembly through paths other than those including these mounts, such as through the ambient atmosphere. Some reduction of such effects has in the past been obtained by applying small sections of padding, foil, and other materials along the various areas of interest. While these introduce material in which vibrational energy may be dissipated, as in the case of fiber pads in which the small fibers dissipate energy through frictions over large total areas, they also unfortunately add mass and bulk which are at a premium in many applications. Furthermore, the installation of these sections of damping material is laborious and costly, requires adhesives which may be difficult to handle, and either involves troublesome cutting and shaping or stocking of sections of different and complex sizes and shapes. With apparatus of intricate configurations, it can become a practical impossibility to apply a sufficient number of accessory damping sections across sufficient surface area of panels, chassis, and the like, to satisfy the objective of optimum damping.

In the FIGURE 1 assembly, on the other hand, vibration difficulties are avoided by virtue of the inherent damping characteristics exhibited by panel elements 2 themselves. These are not of solid sheet stock, although they possess external appearance and surface qualities of solid 1/16 inch sheet, and are, instead, panel sections cut from special prefabricated sheet in which there are two parallel laminas of predetermined relative thicknesses having a permanently viscous medium of predetermined thickness and viscosity distributed fully between them. The FIGURE 2 illustration of an enlarged fragment of the FIGURE 1 assembly shows part of a 1/16 inch aluminum panel joined with a framing member 1 by a rivet 6 in a preferred manner. Contrary to what would be expected, the two parallel planar aluminum laminas 7 and 8 in panel 2 are not of equal thickness, and, in fact, the thinner lamina 7 is less than two-thirds the thickness of lamina 8 while at the same time being in excess of about ten-thousandths of an inch thick. According to the present teachings, the total thickness of the prefabricated panelling must be in excess of 1/40 inch and the thinner lamina must be at least ten-thousandths of an inch thick, else important load-supporting characteristics are lacking and important damping characteristics are not fully developed. Between the two laminas there is distributed a continuous layer of permanently viscous damping medium 9 which in one form comprises a silicone-base material of between at least 500,000 and several million centistoke viscosity and which is of relatively small thickness in relation to the total thickness of the panel. The materials, viscosity, and thicknesses involved in the prefabricated panel construction result in a bonding of the laminas, without auxiliary fastening provisions, inasmuch as molecular adhesiveness between the viscous medium and laminas and molecular cohesiveness within the viscous medium itself preserve the structural integrity of the panels. Within the ranges of viscosity and layer thickness involved, the damping medium 9 neither leaks from between the laminas nor permits the laminas to become unintentionally separated in handling. Rather, the prefabricated self-damped panelling stock advantageously lends itself to manufacturing and assembly practices as though it were solid throughout, and it may be cut, pierced and bent in the manner of solid stock, for example. Because of the desirability of optimizing certain damping actions which are more fully explained later herein, it is advantageous in some applications to avoid unduly binding the two laminas together, and the fastening provisions used in assembly may then be unique also. By way of example of this, the rivet 6 in FIGURE 2 is shown to be accommodated within an opening in panel 2 which is slightly larger than the rivet itself and affords spaces 10 for some of the damping medium or other yieldable material which permits minute relative slip to occur between the laminas 7 and 8 without interference.

The nature of the improvements in damping which result from the aforesaid prefabricated panel construction is exhibited in the FIGURE 3 curves in which vibration transmissibility is plotted against frequency over a frequency range encompassing the fundamental mode of vibration of the panel. Vibration transmissibility, which is plotted logarithmically along the ordinate, expresses the ratio of amplitude of vibration induced in a supported sheet member to amplitude of the exciting vibration of the support. The frequency appearing logarithmically along the abscissa is chosen to represent the exciting vibration frequency. Considering the behavior of a single solid lamina with no damping whatsoever, such as lamina 8 when taken alone, it is found that as the impressed excitation frequency is increased the amplification or magnification is characterized by a curve such as curve 11. At its natural resonant frequency, $f_o$, this undamped sheet theoretically approaches an infinite magnification of vibration, although, in practice, it generally reaches a very high value instead. Occurrence of the resonance condition is undesirable and is sought to be avoided, of course, and the sheet is commonly made more massive to shift the resonance frequency upwardly and out of the expected range of vibrations. Alternatively, or in conjunction with this detuning, the sheet can be made of stronger materials which will more safely withstand the maximum vibrations, but the undesirable result of both practices is to increase the bulk and the material costs far in excess of what would be required to take care of static requirements alone. Moreover, even if the thickness of the sheet material is increased, to detune and to afford greater strength, the effect is merely to shift the same type of response curve higher into the frequency spectrum, and the maximum magnification or transmissibility is not thereby reduced. Curve 12 illustrates this condition, the response at resonant frequency $f_a$ being theoretically infinite and, in practice, disturbingly high. Rigid attachments of lamina 7 to laminate 8 would result in an undamped panel having a response like that of curve 12, the effect being as though lamina 8 were merely made thicker, and there would be no suppression of maximum transmissibility.

Improvement of the response characteristic does result, however, when the permanently viscous damping medium 9 is introduced. If this medium has an extremely high viscosity, the two laminas tend to behave much like one solid lamina, and the response curve is highly peaked, as shown by curve 13. Similarly, it is undesirable if the damping material has a very low viscosity, because the resulting response curve 14 is also highly peaked at resonance. However, dynamic behavior becomes dramatically altered when the viscosity of damping material 9 is made optimum. Then, the optimized response characteristic, depicted by curve 15, possesses an advantageously low finite peak of magnifications at resonant frequency $f_r$ and is also desirably broad and flattened near its maximum point 16. Both the damping layer thickness and viscosity influence the damping characteristics, as is referred to hereinafter. A principal action occasioning the desired damping is that of viscous shearing in the damping medium. Such shearing develops out of minute relative slippages between adjacent surfaces of the laminas as the panel undergoes vibration, and while the actual relative movements are extremely small they occur rapidly and over relatively large total areas which nevertheless occasion substantial energy dissipations.

These needed slippages between laminas of the prefabricated panel are not developed efficiently unless both laminas have a plate-like stiffness which enables each of them to resist both the tensions and compressions experienced due to shocks and vibration. If either is discontinuous or is so thin as to be pliable and foil-like, then full slippage and damping effects are not realized and the weaker lamina not only makes no contribution to support of the static load but itself constitutes added load. It is not enough, however, merely to exceed by any convenient amount the minimum dimension of about ten thousandths of an inch which will yield the desired characteristic in the case of common metal laminas. According to these teachings, the two laminas each serve to support part of the panel loading and, because of proportioned relative thicknesses, do so with improved total strength and improved strength-to-weight ratios.

It is found, for example, that if for the sake of the aforesaid improved viscous damping one employs two plate-like laminas of the same material and equal thickness, the panel's static stiffness is only about one-fourth that of a comparable solid panel of the same material and total thickness. This circumstance would suggest the viscous damping provisions to be unattractive, particularly since compensation for the ensuing structural weakness would in turn result in greater thicknesses, and weights, of the laminas. In this connection, if two panel laminations 7a and 8a of the same material in FIGURE 4 possess the marked thicknesses $h_1$ and $h_2$, respectively, and the ratio $h_1/h_2$ is plotted along an abscissa in relation to an ordinate expressing the ratio of stiffness of the laminated panel to the stiffness of a solid panel of thickness $h_1+h_2$, the relationship is like that of curve 17 in FIGURE 5. The slopes of this curve indicate that from the standpoint of support of loads there is virtually no advantage to be realized in making the thinner lamina 7a more than two thirds the thickness of the other. This limiting condition is designated by point 18; upwardly beyond this to another limit point, the increased thickness of lamina 8a yields highly important improvement in the panel stiffness. The upper limit to which such improvement in panel strength can be extended is designated by the further point 19 on the curve, and the curve is dashed along portion 20 because it is meaningless to consider that there is stiffness to $h_1$ in this range. The point 19 is identifiable because of the facts that the thinner lamina should be at least about ten-thousandths of an inch thick, $h_1$, and the total panel thickness $h_1+h_2$ will not exceed about one-eighth inch. The latter thickness is established as being about a practical maximum for panelling purposes, and it is also known that thicker metal structures well lend themselves to damping in accordance with other techniques. Below the ten-thousandths inch thickness level, the useful metal panel lamina materials such as aluminum, magnesium, beryllium and steel are undesirably pliable and foil-like and do not have the resistance to tear, abrasion, and impact which are needed in a prefabricated panelling stock. But, when of at least this minimum thickness, the thinner lamina is of sufficient strength to provide resistance to the forces and wear expected of panel surfaces and, conveniently, the user of the panel need not ordinarily be concerned about which laminate is more exposed to the most severe environmental conditions because both sides are of high strength and stiffness. It is important that the thinner lamina actually adds to the panel load-supporting strengths rather than constituting a mere damping appendage.

The plot of curve 17 in FIGURE 5 considers only the stiffness effects of laminas 7a and 8a in FIGURE 4, the damping layer 9a being of only small thickness $h_v$ in relation to the total panel thickness of at most one-eighth inch and being of relatively minor bonding effect insofar as its tendencies to make the laminas possess the structural strength of one solid sheet are concerned. However, the damping layer thickness, $h_v$, and its viscosity are small and large enough, respectively, to insure that the laminas tend to adhere to one another through this medium and thereby permit conventional handling and processing of the prefabricated panelling as though it were solid sheet. Shear damping effects in this medium are developed in a manner which is readily understood through reference to FIGURES 4 and 6, the latter figure representing the panelling of FIGURE 4 in an exaggeration of instantaneous high flexure such as tends to occur under severe vibration and shock conditions. Under the dynamic conditions (FIGURE 6), the two adjacent lamina surface points 21 and 22 which had been disposed opposite one another in the passive state (FIGURE 4) become relatively displaced, and this displacement must be attended by shearing of the constrained damping medium 9a adhering to the laminas. Because both laminas are stiff, the relative displacements at their interfaces are the consequence of tension and compression on their opposite sides as they are flexed. Effects similar to those discussed occur at the higher vibration modes to produce shear stresses and energy losses even though the slippage may be minute. Total dissipation of energy tends to be large because of the broad panel areas involved.

In considering the values of viscosity coefficients and damping layer thicknesses to be employed, it is convenient to refer to a parameter N, which is related to panel stiffnesses as follows:

$$N=\frac{K_\infty}{K_0}-1$$

where $K_\infty$ is the panel stiffness with an infinite amount of damping, and $K_0$ is the panel stiffness with zero damping. Inasmuch as panel stiffness varies with flexural rigidity of the panel, EI, where E is the modulus of elasticity of the material and I is the area moment of inertia taken about the neutral axis of flexure, the parameter N is capable of calculation as:

$$N=\frac{(EI)_\infty}{(EI)_0}-1$$

the subscripts $\infty$ and $_0$ denoting the infinite and zero damped cases, respectively, and the neutral axis of flexure being known in each case to permit the calculation of I. The parameter N permits determination of the optimum resonant frequency, $f_r$, and optimum resonant transmissibility, $Qop$, for panels damped in accordance with these teachings from the expressions:

$$f_r=f_0\sqrt{\frac{2(N+1)}{N+2}}$$

where $f_0$ is the resonant frequency without damping, and $$Qop=1+\frac{2}{N}$$

Suppression of the maximum value of optimum resonant transmissibility, $Qop$, is a prime objective, of course, and it is apparent that large N factors will promote this result. Derivation of N in terms of the thicknesses of the two laminations, $h_1$ and $h_2$, thickness of damping layer, $h_v$, total panel thickness, $h(h=h_1+h_2+h_v)$, and moduli of elasticity $E_1$ and $E_2$ of the thinner and thicker laminas, yields:

$$N=\frac{3\left(\frac{E_1}{E_2}\right)\left(\frac{h_1}{h_2}\right)\left(\frac{h_1}{h_2}+1\right)^2\left[\frac{1+\frac{h_v}{h}}{1-\frac{h_v}{h}}\right]^2}{\left[\left(\frac{E_1}{E_2}\right)\left(\frac{h_1}{h_2}\right)^3+1\right]\left[\left(\frac{E_1}{E_2}\right)\left(\frac{h_1}{h_2}\right)+1\right]}$$

From this equation it is also obviously desirable to preserve the relative thickness of the viscous damping layer, $h_v/h$, at a substantial value, although there are practical limits dictated by the thicknesses which can be achieved and maintained without the possibilities of leakage and of unintended slipping between the laminas. Curves 23 through 27 in FIGURE 5 characterize the improvements in this N factor in the case of two laminas of the same material and different thickness ratios as the damping layer thickness ratio $$\frac{h_v}{h}$$

is increased progressively and is at values of 0, 0.05, 0.10, 0.15, and 0.20, respectively, for these curves. Increase in the N factor is also seen to occur with increase in the ratio $h_1/h_2$ of the lamina thicknesses, although the limit position 18 of the structural strength curve 17 restricts the extent of advantage to be realized in this way. But, as is discussed later herein, the maximum values of N which can be obtained by increasing the damping layer thickness ratio $h_v/h$ can be advantageously caused to lie within the desired limited range of lamina thicknesses by increasing the modulus of elasticity of the thinner metal lamina to about three times that of the thicker lamina.

Ideally, there are specific optimum values of viscosity of the permanently viscous damping material which should be established to produce minimum resonant transmissibility in given constructions of the self-damped laminated panels. However, when the N factor is at least 2, the requirement of close tolerance on viscosity is relaxed somewhat. The family of curves 28 through 34 in FIGURE 7 illustrate this desensitizing as the N factor is assumed to be increased from 0.5 to 15, the logarithmic scale of resonant transmissibility, Q, there being related to an abscissa along which a viscosity ratio $\mu/\mu_{op}$ is scaled logarithmically. This ratio is that of arbitrary values of viscosity, $\mu$, to the optimum value of the coefficient of viscosity, $\mu_{op}$. Curves 31 through 34, for values of N of 2 and over, tend to be broad and flat in the regions near unity viscosity ratio, and this signifies that substantially optimum (lowest) transmissibility can be realized in high-N constructions even though the coefficient of viscosity departs from the exact theoretical optimum value. A construction in which N is about 2, and in which the coefficient of viscosity is only roughly near optimum, will yet occasion a maximum transmissibility below 3, which of course represents a vast improvement over the transmissibility of solid panels which commonly run to between 50–200.

In the contemplated sizes of prefabricated stock, which are about ⅛ inch maximum thickness and with a coefficient of viscosity of between 500,000 and several million centistokes, the damping layer thickness $h_v$ would generally not be expected to exceed about 25 thousandths of an inch, such that the thickness ratio of $h_v/h=0.2$ would be a large one from a practical standpoint, and the N factor would reach a maximum near 5. Heavy silicone-based materials, such as oils and adhesives, having viscosity coefficients between about 500,000 to several million centistokes are satisfactory damping layer materials in that they possess uniform density, permanently viscose characteristics, and high molecular adhesiveness to the preferred metal laminas of aluminum, steel, magnesium and beryllium, and their alloys. The damping layers may be of other materials having such characteristics, and may also be in such different forms as a doubly coated tape having the damping medium applied to both sides. The effects of increased damping layer thickness ratio, $h_v/h$, upon resonant transmissibility of a panel having two laminas of the same modulus of elasticity appear from the family of curves 35 through 39 in FIGURE 8. As this ratio increases from zero to the aforesaid figure of 0.2 by increments of 0.05, the resonant transmissibility drops advantageously over the entire range of lamina thickness ratios of interest. Insofar as possible, the damping layer thickness is thus to be increased, the improvements in transmissibility being particularly pronounced where the lamina thickness ratios are small.

When the modulus of elasticity of the thinner panel lamina is made larger, the maximum N factor occurs for a lower lamina thickness ratio than in the case (FIGURE 5) where the moduli of elasticity are the same. FIGURE 9 plots N factor vs. lamina thickness ratio for the arrangement wherein the thinner metal lamina has a modulus of elasticity about three times that of the thicker lamina, as for the materials steel and aluminum. Curves 40 through 44, for the increasing damping layer thickness ratios, $h_v/h$, illustrate occurrence of peak N factor values at the lamina thickness ratio of about 0.575, which lies within the contemplated range of lamina thicknesses. N factor values are also advantageously increased elsewhere throughout the range. Increase of the modulus of elasticity ratio to about 4, as for the case of a thinner lamina of beryllium and a thicker laminate of aluminum, increases the N factor yet further across the lower portion of the range of lamina thickness ratios and brings about the maxima of the N factors at about a thickness ratio of 0.5. Resonant transmissibility is also desirably reduced as a consequence of increase in the modulus of elasticity ratio, as is evidenced by the FIGURE 10 characteristics which are typical of the steel and aluminum lamina combination. There, the curves 45, 46 and 47 for the $h_v/h$ ratios of zero, 0.1 and 0.2 may be noted to characterize a significantly lower transmissibility for the lower lamina thickness ratios than do the corresponding curves 35, 37 and 39, respectively, in FIGURE 8.

Structural aid to the preservation of advantageously high damping layer thickness ratios, $h_v/h$, can be introduced by certain mechanical spacers such as those represented in the self-damped panel construction of FIGURE 11. While the thicker lamina 48 comprises a flat and regular plate, the superposed thinner lamina 49 is modified by having a plurality of small spaced projections 50 formed along the inner surface by indentations from the outside. The processing of lamination 49 to produce the uniform-height projections is of course performed before assembly into the illustrated relationship with the thicker lamina and the damping medium 51. Projections 50 are distributed to prevent the laminations from being pressed close together through the soft damping medium, but they are employed sparingly so that they do not appreciably alter the effective damping layer spacing 52 ($h_v$). Although it is true that at the site of each projection the lamina spacing is smaller than 52, the total area of the projections involved in a given panel is negligibly small in relation to the remaining areas fully spaced by the distance 52, and the effective damping layer thickness for the panel is essentially unaltered. Other projection or spacer patterns can be exploited in accordance with these principles.

Another panel construction which provides a high degree of damping and affords high structural strength with substantial economy of material appears in FIGURE 12, wherein there are three principal lamina members, 53, 54 and 55. The principal load-supporting component is the central member 54, which takes the known form of a composite assembly of a middle metal honeycomb 56 the edges of which are glued to thin metal sheets 57 and 58. This component possesses great strength in low weight and, for damping purposes, advantageously causes the associated plate-like laminas 53 and 55 to be rather widely displaced from the neutral bending plane of the panel. Layers of permanently viscous damping medium 59 and 60 are disposed intermediate the central member 54 and the two associated laminas 53 and 55, respectively, and serve purposes referred to earlier herein. As in the case of the other two-lamina panel constructions, this panel may be used advantageously with but one of the damping layers and outer laminas.

It should be understood that the specific embodiments of the invention herein disclosed are intended to be of a descriptive rather than a limiting character, and that various changes, combinations, substitutions or modifications may be effected in practice of these teachings without departing either in spirit or scope from this invention in its broader aspects.

What I claim as new and desire to secure by Letters Patent of the United States is:

1. A prefabricated self-damped thin metal panel subject to flexural movements responsive to excitation of vibratory character comprising a first metal laminate member having a first thickness affording structural stiffness to withstand part of the loads impressed upon said panel, at least another solid laminate member of metal having at least the same modulus of elasticity as said first member and having a thickness not greater than about two-thirds that of said first thickness and not less than ten-thousandths of an inch (the substantially minimum thickness at which said other member has stiffness characteristics of plate to withstand part of said loads), said metal laminate members being disposed in coextensive parallel relationship, a damping medium which is substantially permanently viscous and is liquid at normal atmospheric temperatures uniformly distributed in a thin self-retaining layer intermediate said laminate members, said damping liquid preserving said laminate members together and retaining itself between said laminate members by molecular adhesion with the metal of said members and by molecular cohesion within said thin layer, and said damping liquid having a coefficient of viscosity of at least 500,000 centistokes at normal atmospheric temperatures, whereby energy of vibration of said panel and of the loads impressed thereon is dissipated within said damping liquid upon occurrence of relative displacements between adjacent surfaces of said laminate members responsive to said flexural movements.

2. A prefabricated self-damped metal panel of between about 1/32 and 1/8 inch thickness which is subject to flexural movements responsive to excitation of vibratory character, comprising a first metal lamina having a first uniform thickness affording structural stiffness to withstand part of the loads impressed upon said panel, a second metal lamina having at least the same modulus of elasticity as said first lamina and having a second uniform thickness not greater than about two-thirds that of said first thickness and not less than about ten-thousandths of an inch (the substantially minimum thickness at which said second metal lamina has stiffness characteristics of plate to withstand part of the loads impressed upon said panel), and a damping medium substantially permanently viscous at normal atmospheric temperatures uniformly distributed in a thin continuous layer between said first and second laminas and preserving said laminas together in a coextensive parallel relationship by high molecular adhesion with the metal of said laminas and by high molecular cohesion within said thin layer, whereby said panel withstands high loading and dissipates energy of vibration within said damping medium upon occurrence of minute relative displacements between adjacent surfaces of said laminas responsive to said flexural movements.

3. A prefabricated self-damped metal panel as set forth in claim 2 wherein said first and second metal laminas are solid sheets of material having the same modulus of elasticity, wherein said damping medium comprises a silicone oil having a coefficient of viscosity of at least about 500,000 centistokes at normal atmospheric temperatures, and wherein the thickness of said layer of damping medium is less than about one-fifth the thickness of said panel, whereby each part of said panel has inherently suppressed maximum vibration transmissibility characteristics.

4. A prefabricated self-damped metal panel of between about 1/32 and 1/8 inch thickness which is subject to static loading and to flexural movements responsive to excitation of vibratory character, comprising an aluminum lamina having a first uniform thickness affording structural stiffness to withstand part of the loads impressed upon said panel, a second metal lamina having a modulus of elasticity higher than that of said aluminum lamina and having a second uniform thickness not greater than about two-thirds that of said first thickness and not less than about ten-thousandths of an inch (the substantially minimum thickness at which said second metal lamina has stiffness characteristics of plate to withstand part of the loads impressed upon said panel), and a damping material substantially permanently viscous at normal atmospheric temperatures distributed in a thin continuous layer between said laminas and preserving said laminas together in a coextensive parallel relationship by molecular adhesion with the metals of said laminas and by molecular cohesion within said thin layer, said viscous material having a coefficient of viscosity of at least about 500,000 centistokes at normal atmospheric temperatures, whereby said panel withstands high static loading and suppresses vibration transmissibility by dissipating vibrational energy within said thin layer upon occurrence of minute relative displacements between adjacent surfaces of said laminas responsive to said flexural movements.

5. A prefabricated self-damped thin metal panel assembly of relatively light weight which withstands high static loading and suppresses effects of vibration, comprising a first flat solid metal lamina having a first uniform thickness affording structural stiffness to withstand part of the loads impressed upon said panel, a second flat solid metal lamina having at least the same modulus of elasticity as said first lamina and having a second uniform thickness of between about ten-thousandths of an inch (the substantially minimum thickness at which said second metal lamina has stiffness characteristics of plate to withstand part of the loads impressed upon said panel) and about two-thirds said first thickness, whereby said second lamina possesses structural stiffness to withstand the balance of said loads, a material substantially permanently viscous at normal atmospheric temperatures having a coefficient of viscosity of at least about 500,000 centistokes at normal atmospheric temperatures distributed in a continuous layer between said laminas and preserving said laminas together in a coextensive parallel relationship by molecular adhesion with the metals of said laminas and by molecular cohesion within said layer, said continuous layer having a thickness less than about one-fifth the total thickness of said panel, whereby each part of said panel inherently suppresses maximum transmissibility characteristics thereof by dissipating vibrational energy within said viscous material upon occurrence of minute relative displacements between adjacent surfaces of said laminas under conditions of flexure thereof.

6. A prefabricated self-damped metal panel assembly as set forth in claim 5 wherein said laminas are provided with aligned openings transversely therethrough at at least one position, and further comprising fastener means passing through both said openings with small clearance which accommodates said minute relative displacements between said laminas without interference.

References Cited in the file of this patent

UNITED STATES PATENTS

| | | |
|---|---|---|
| 2,129,308 | Randall | Sept. 6, 1938 |
| 2,186,223 | Willetts | Jan. 9, 1940 |
| 2,196,615 | Surprenant | Apr. 9, 1940 |
| 2,237,623 | Ledwinka | Apr. 8, 1941 |
| 2,304,718 | Swart | Dec. 8, 1942 |
| 2,313,181 | Thomas | Mar. 9, 1943 |
| 2,644,777 | Havens | July 7, 1953 |
| 2,653,889 | Hager et al. | Sept. 29, 1953 |
| 2,814,481 | Van House | Nov. 26, 1957 |
| 2,819,032 | Detrie et al. | Jan. 7, 1958 |
| 2,930,455 | Williams | Mar. 29, 1960 |

FOREIGN PATENTS

| | | |
|---|---|---|
| 513,171 | Great Britain | Oct. 5, 1939 |